United States Patent [19]

Bonnyman

[11] Patent Number: 4,909,890
[45] Date of Patent: Mar. 20, 1990

[54] APPARATUS FOR PROTECTIVE FILM LAMINATION

[76] Inventor: Arthur W. Bonnyman, 3850 Piedmont Ave., Oakland, Calif. 94611

[21] Appl. No.: 191,003

[22] Filed: May 6, 1988

[51] Int. Cl.⁴ .............................................. B32B 31/14
[52] U.S. Cl. ..................................... 156/494; 226/195; 271/183
[58] Field of Search .......................... 226/93, 195, 95; 271/225, 310, 183; 156/285, 382, 555, 229, 494, 495

[56] References Cited

U.S. PATENT DOCUMENTS

| | | | |
|---|---|---|---|
| 3,076,492 | 2/1963 | Monks | 271/183 |
| 3,451,670 | 6/1969 | Staines | 271/183 |
| 3,658,629 | 4/1972 | Cramer | 156/555 |
| 3,975,012 | 8/1976 | Matthews | 271/183 |
| 4,002,047 | 1/1977 | MacPhee | 271/183 |
| 4,013,284 | 3/1977 | Demetre | 271/183 |
| 4,119,309 | 10/1978 | Mayer | 271/183 |
| 4,221,377 | 9/1980 | Bodewein | 271/183 |
| 4,268,345 | 5/1981 | Semchuck | 156/555 |
| 4,585,509 | 4/1986 | Obayashi | 156/555 |
| 4,650,536 | 3/1987 | Ceraso | 156/555 |
| 4,743,334 | 5/1988 | Singer | 156/555 |
| 4,772,353 | 9/1988 | Weiss | 156/555 |

*Primary Examiner*—Merrell C. Cashion, Jr.
*Attorney, Agent, or Firm*—H. Michael Brucker

[57] ABSTRACT

Method and apparatus for improving the performance of laminating protective plastic to a document using a machine of the type in which plastic laminating film from a roll is drawn over a guide member surface and between laminating pressure rollers by a film drive means wherein wrinkles that form naturally at the location of the guide member surface are eliminated by locating a vacuum means in the path of the film at or near the guide surface to create a generally uniform drag force across substantially the entire width of the film in opposition to the force drawing the film through the system.

16 Claims, 4 Drawing Sheets

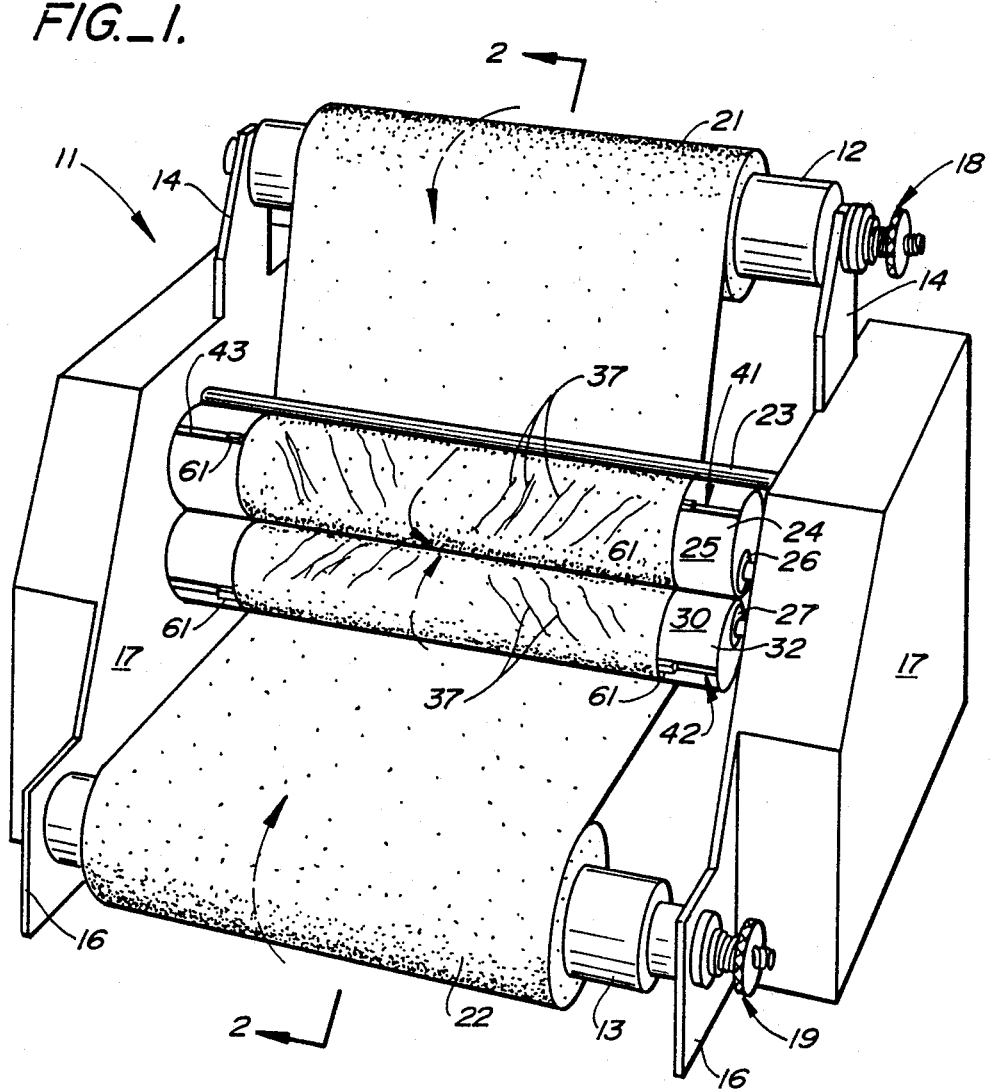
FIG._1.
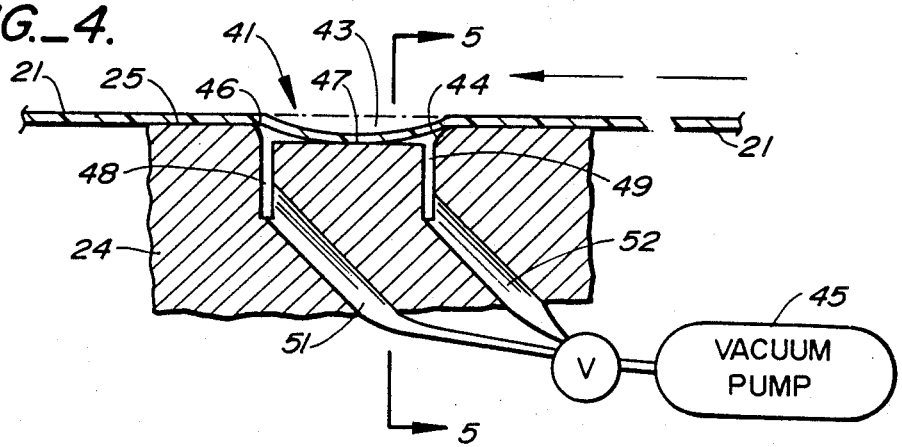
FIG._4.

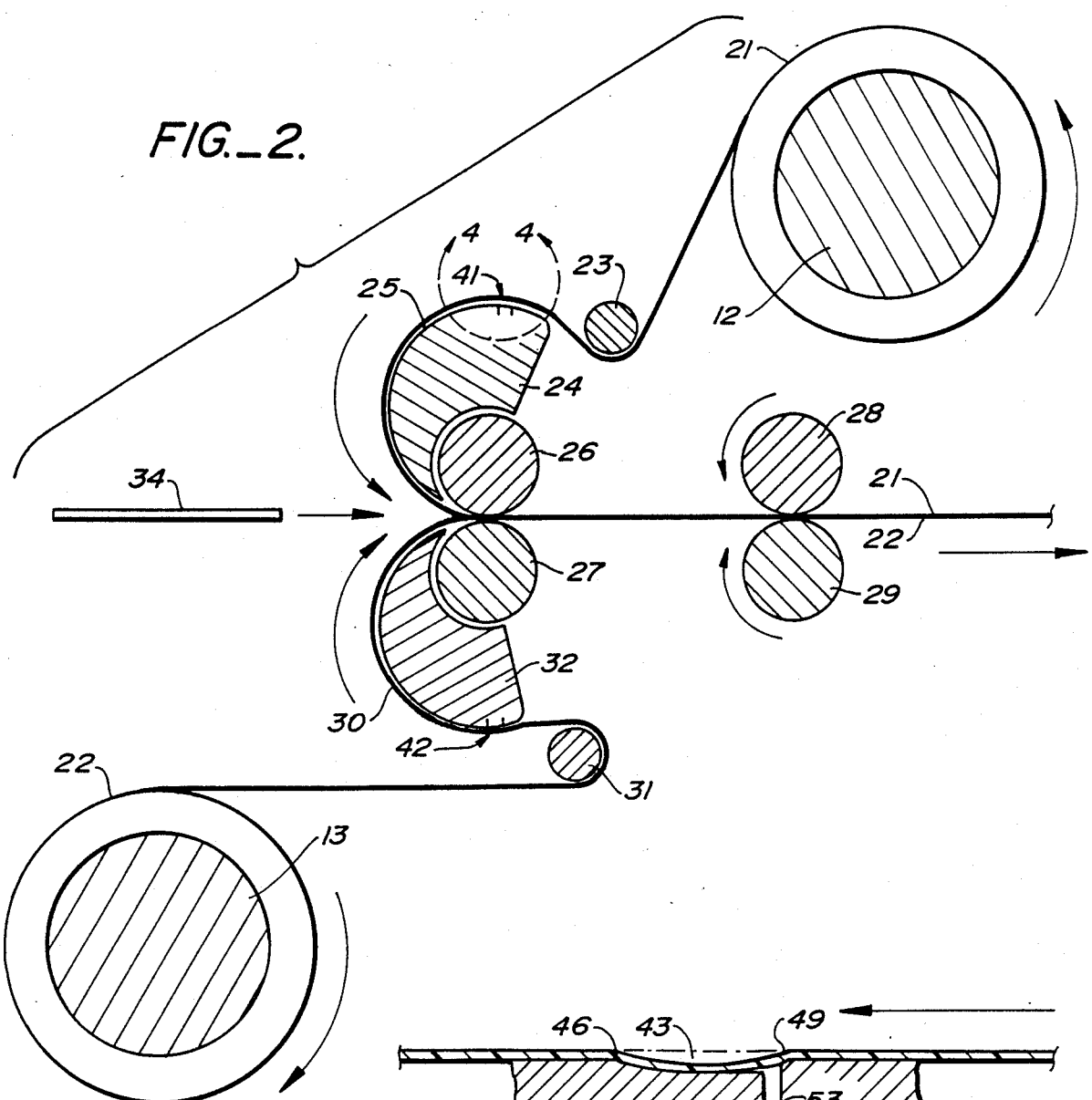
FIG._2.
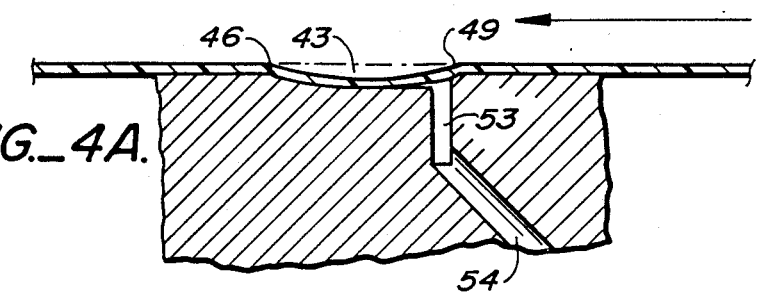
FIG._4A.
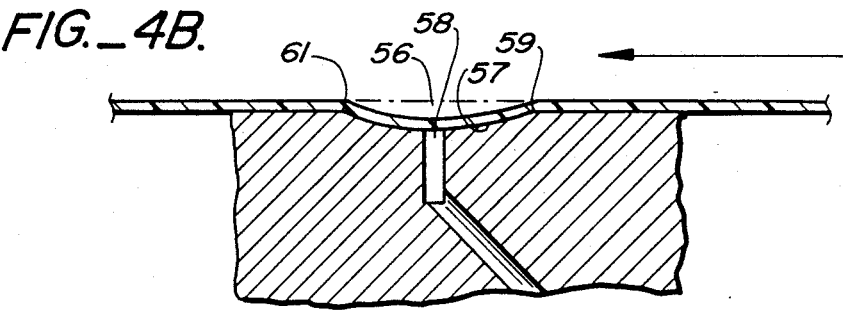
FIG._4B.

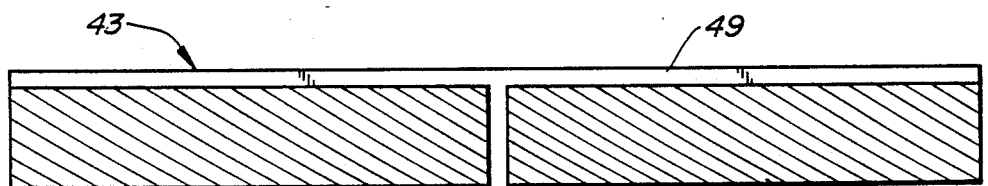
FIG._5.
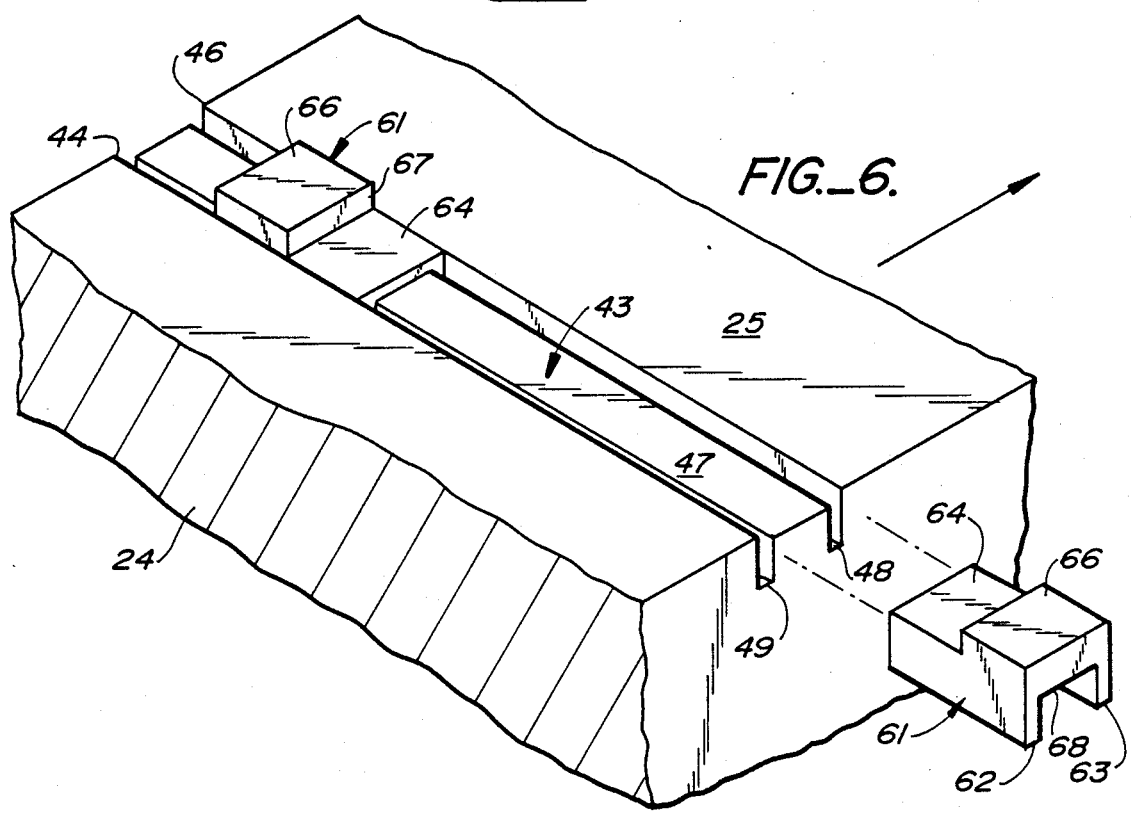
FIG._6.
FIG._7.
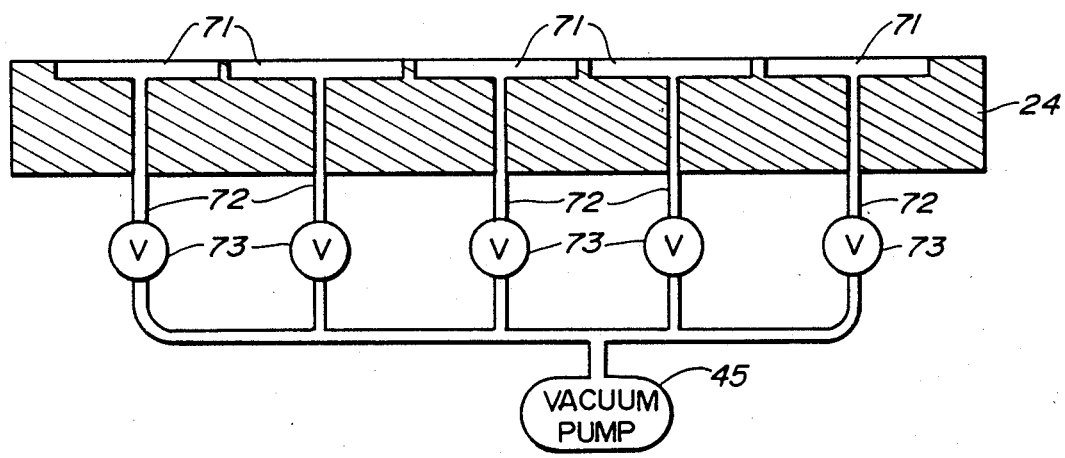

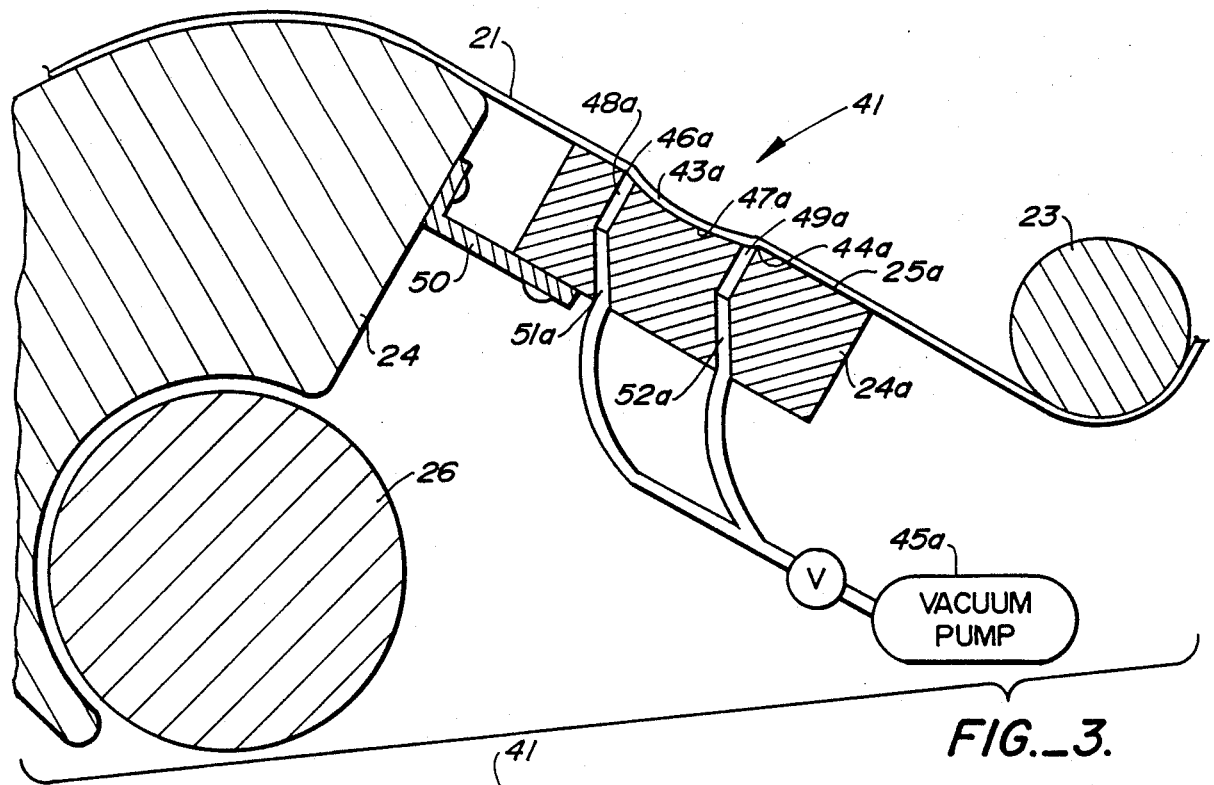
FIG._3.
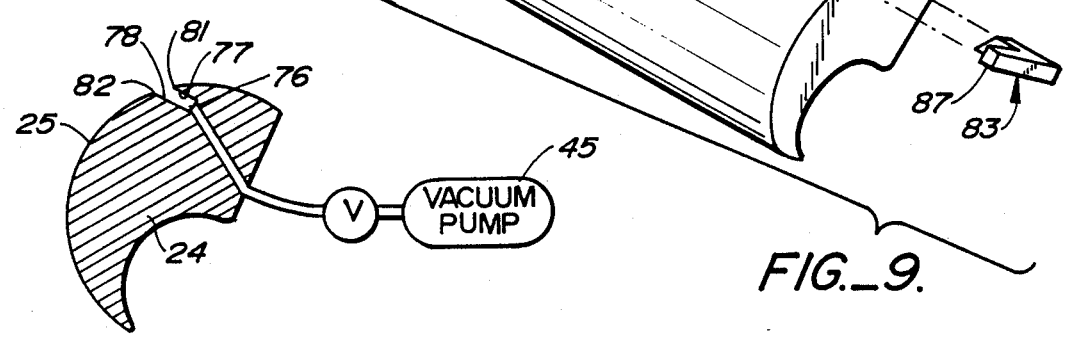
FIG._8.
FIG._9.

APPARATUS FOR PROTECTIVE FILM LAMINATION

BACKGROUND OF THE INVENTION

The present invention relates to methods and apparatus for the application of protective film lamination. In particular, the invention relates to the lamination of documents for their protection and preservation. Machines and methods for applying a protective film lamination to documents is well established and represents a substantial industry. The present invention relates particularly to laminating methods and machines that employ plastic laminating material packaged in a roll, a laminating plastic material supply roller on which the plastic material is mounted, a guide member having a surface over which laminating plastic material is passed in contact therewith, laminating rollers through which laminating plastic material is guided by the guide surface and where pressure is applied, and drive means for causing laminating plastic material to be fed off of the supply roller, over the guide surface and through the laminating rollers. An example of such a machine is the 6000 Series laminator manufactured by GBC, Inc. of North Brook, Ill., U.S.A. which is of the type adapted to use heat activated laminating films such as those offered by Graphic Laminating, Inc. of Cleveland, Ohio.

In machines of this type the guide member is part of a heat shoe which heats the plastic material to the temperature necessary to activate the adhesive qualities of the film. When pressure sensitive films are used the adhesive quality of the film is made available by removal of a release liner in which case the guide surface may or may not be heated. The invention will be described with reference to the type of machine in which the guide surface is heated although the invention is adaptable equally to machines in which the guide surfaces need not or is not heated.

The laminating machines to which the present invention relates perform their laminating function by feeding laminating plastic films from two separate supply rolls over individual heated guide surfaces called "heat shoes" where the adhesive qualities of the films are activated. With the films heated to the required temperature, the document to be laminated is inserted between the films after which all three components are passed together through the laminating rollers which apply pressure to the laminate thereby sealing the document (substrate) to the protective layers of laminating film.

A properly laminated document is one that has a clear, wrinkle- and bubble-free coating of plastic film adhered to it which does not curl after the heated plastic cools. In order to achieve these desired results, it is imperative that the film applied to the document be wrinkle-free and not stretched to the extent that will cause shrinkage when the film cools. While these results are being realized by machines currently available in the market and known in the prior art, they are doing so using methods and apparatus which have inherent deficiencies that cause undue wear and tear on machine components, require constant operator attention, result in substantial film waste, limit the operating speed of the process and require film manufactured to high tolerances. Other disadvantages found in prior art machines will be discussed below.

In the typical laminating machine of the type to which the present invention relates, the driving force that draws the laminating plastic film material over a guide surface (heat shoe) and through the laminating rollers is provided by drive means usually in the form of a pair of drive rollers which frictionally engage the film and move it through the system. It is essential for heat activated film that the entire surface of the film be heated before it contacts the substrate and prior to the film being led between the laminating rollers in order that the adhesive of the film be activated over its entire surface. Any wrinkles in the film as it passes over the heat shoe represent areas of the film not contacting the heat shoe surface and thus likely not heated sufficiently to activate the adhesive qualities of the film. In addition to poor adhesion, any wrinkles that are permitted to exist when the film is drawn between the laminating rollers will result in an uneven and unacceptable surface on the document being laminated. Thus, it is essential for both heat activated as well as pressure sensitive films that all wrinkles be eliminated before the films are brought into contact and enter between the laminating rollers.

In order to eliminate wrinkles in the laminating film material as it passes over the guide surface, prior art machines impose a substantial drag force on the rollers that carry the supply roll of plastic laminating film. The drive rollers that move the plastic film through the system provide the force to overcome the drag on the supply rollers, which force is transmitted through the film itself. This force in the film stretches the film to eliminate wrinkles at the guide surface. When the drag force of a supply roller is properly adjusted it will turn only when the tension on the film itself as applied by the drive rollers is sufficient to eliminate wrinkles in the laminating material.

Because the diameter of the plastic laminating material roll decreases as the plastic is used, an increasing amount of tension in the film is required to overcome the drag force on the supply rollers. If adjustment is not made to diminish the amount of drag force on the supply rollers as the diameter of the roll diminishes, the tension in the film can build to the point where it causes distortion in the film which in turn results in curl in the laminated document or ultimately breaks. Thus, it is necessary with prior art devices to change the drag force applied to the supply rollers as material is consumed from the roll. Most of the laminators presently in use and known in the art require that the drag force on the supply rollers be frequently manually adjusted requiring constant attention during the laminating process and the skill of an experienced operator. Of late, some machines have been equipped with means for automatic adjustment of the drag force on the supply rollers through the use of sensors and microprocessors, but these devices have proven to be less than reliable and greatly add to the cost of the machines.

One of the problems attendent to using supply roller drag force as a means of wrinkle elimination is that of film breakage on start-up. In order to start the film moving it is necessary to overcome the drag forces on the supply rollers. Since the start-up force to get the rollers moving is substantially greater than the force required to maintain the rollers moving, film is likely to break if the drag force on the supply rollers is not reduced prior to start-up. If start-up is attempted after the heat shoes have been activated and are up to temperature, the heated film is even more likely to break. Thus, either the heat shoes have to be cooled down which is very time-consuming, or the drag force on the supply roller must be greatly reduced and then readjusted as the film begins to feed between the drive rollers. In either event, the start-up is time-consuming and requires a substantial amount of film to be fed through the drive rollers before actual document lamination can begin. The waste of material is not insubstantial.

The fundamental problem with prior art devices can be found in the fact that it is not possible to create a uniform tension across the width of the film at the location of the guide surface by simply imposing a drag force on the remote supply rollers. In fact, the wider the film the more difficult it becomes to eliminate wrinkles in this way and the greater the forces required. The inability to establish a uniform tension across the film on the guide surface derives from several sources including non-uniformities in the film itself, uneven pressure applied by idler bars between the supply rollers and guide surface, unevenness in the guide surface, unequal forces applied by the devices that apply the drag force as well as different rates of wear in the various machines bearings. Where the irregularity in the film causes forces in the film to be too unevenly distributed the material must be rejected since it is not possible to eliminate wrinkles without breaking or seriously distorting such film.

In order to eliminate all the wrinkles using the prior art method, the drag force must be sufficient to create tension in the area of the film carrying the least amount of force, but this creates more force than necessary in the rest of the film. This greatly burdens the machine parts themselves and often causes distortion in the final product. Because of these inherent difficulties, laminating films more than thirty inches wide pose serious problems making laminating very difficult, and only possible with machines capable of handling substantial forces.

As the speed of the laminating process increases, even greater drag forces on the supply rollers is demanded in order to eliminate wrinkles. Because the films and machines can only carry so much force and continue to operate, speeds must be maintained low enough to avoid the application of destructive forces. Thus, the wider the film, the slower the process.

The methods and apparatus of the present invention assure a constant supply of wrinkle-free heated laminating plastic material to the laminating rollers by a means totally independent of the force required to turn the supply rollers. By eliminating the substantial drag forces on the supply roller and by not imposing any force of like magnitude on the plastic film anywhere else throughout the system, the film is fed through the system unstretched and with forces well within the tensile strengths of the film itself even when it has been heated to the temperature required to activate its adhesive qualities. Accordingly, the present invention permits immediate film start-up with the heat shoes at operating temperature without resultant film breakage or stretching thus eliminating machine down time and wasted material. In addition, the present invention permits operation at greatly increased speeds over those attainable where the traditional supply-roller drag forces are used as the means for eliminating wrinkles. One of the remarkable advantages of the present invention is that the methods and apparatus thereof are fully adaptable to existing machines requiring only a relatively slight modification thereto. Thus, the present invention permits substantial upgrading of the productivity of existing laminating machines without the capital investment necessary to replace the machine altogether. In addition, the forces on machine parts are greatly reduced significantly adding to the expected useful life of the machine.

DESCRIPTION OF THE PRESENT INVENTION

A guide member of the machines to which the present invention relates characteristically has an arcuate surface over which laminating plastic material is passed in contact therewith to guide (and heat in the case of heat activated films) the plastic film to the laminating rollers. In order to eliminate the wrinkles in the film at the guide surface, the present invention employs a vacuum means which engages the film near to where it contacts the guide surface and which establishes a uniform drag force across the width of the film. The vacuum means can be separate from the guide member, but in the preferred embodiment, the vacuum means is integral with the guide member and located near where the film first engages the guide surface. In this way, the vacuum means not only applies a drag force on the film but also withdraws any air that is present between the plastic laminating material and the guide surface, which permits very high speed operation since air disbursement from wrinkles is no longer a problem. In either case and where the guide surface is part of a heat shoe, all of the surface of the plastic material is drawn into engagement with the surface of the heat shoe and is brought up to the temperature necessary to activate its adhesive qualities. Thus, a basic requirement for a good lamination is achieved by the invention by assuring that there are no "cold spots" in the laminating film when it contacts the substrate and enters the laminating rollers.

In the present invention, a very small drag force is maintained on the supply rollers to prevent the rollers from running free and supplying film at a greater rate than required. This force does not need to be changed as the roll diameter changes. Thus, the dominant drag force on the film is that applied by the vacuum means which because of its close proximity to the wrinkles and its even distribution across the width of the film is effective with only a fraction of the force on the film required by prior art roller drag systems. By virtue of the methods and apparatus of the present invention, the laminating rollers receive flat, wrinkle-free, well-heated plastic laminating film which is unstretched and which produces high quality lamination without the necessity of any in-process adjustments to tension mechanisms on the machine and without delays and waste now experienced in starting and stopping the laminating process. In addition, high quality lamination is achieved, at high speeds without large forces being imposed on the film or machine parts.

The method of the present invention comprises generally the step of applying a vacuum to the laminating film near to the guide and across substantially the entire width of the film to apply a drag force on the film in opposition the force on the film moving it through the system.

DESCRIPTION OF THE DRAWINGS

FIG. 1 is an overall perspective of a laminator retrofitted with the present invention;

FIG. 2 is a schematic cross-section of FIG. 1;

FIG. 3 is a schematic cross-section of a portion of FIG. 1 showing an alternative form of the invention where the vacuum means is separate from the guide (heat shoe) surface;

FIG. 4 is a greatly enlarged schematic cross-section of the portion of FIG. 2 indicated by arrows 4—4;

FIG. 4A is an alternative embodiment of the portion of the invention shown in FIG. 4;

FIG. 4B is yet another alternative embodiment of the portion of the invention shown in FIG. 4;

FIG. 5 is a transverse schematic cross-section taken along the lines 5—5 of FIG. 4;

FIG. 6 is a perspective view of the portion of the invention shown in FIG. 3 showing the use of sealing and guide blocks;

FIG. 7 is schematic illustration of an alternative embodiment of the invention employing a plurality of sub-channels and independent vacuum ports and valves to control edge sealing;

FIG. 8 is a schematic cross-section of an alternative embodiment of the portion of the invention shown in FIG. 4; and FIG. 9 is a perspective view of the embodiment of FIG. 8.

DESCRIPTION OF PREFERRED EMBODIMENT

Referring to FIGS. 1 and 2, a laminating machine 11 of the type to which the present invention relates, includes a pair of supply rollers 12 and 13 rotatably mounted on support brackets 14 and 16, respectively, which are integrally connected to the machine frame 17. A tension mechanism 18 associated with roller 12 and a tension mechanism 19 associated with roller 13 provide the means by which a drag force is imposed on the supply rollers and which determines the amount of force required to turn the rollers in their respective brackets. The tension mechanisms 18 and 19 are not shown in detail and can take any one of a number of forms well known in the art and in that regard do not form any portion of the invention.

A roll of plastic laminating film material 21 is non-rotatably mounted on supply roller 12 and has those properties well known in the laminating art which permit bonding to a substrate. Similarly, a roll of laminating plastic film material 22 is non-rotatably mounted on supply roller 13 and provides along with the plastic material 21 the protective coating between which a document (substrate) is laminated for purposes of preservation and protection.

In operation, the plastic film 21 is led under an idler 23 over the surface 25 of a guide member (heat shoe) 24 and between laminating rollers 26 and 27 before passing between drive rollers 28 and 29.

Similarly, the plastic laminating material 22 passes around an idler 31 before passing over the surface 30 of guide member (heat shoe) 32 and between laminating rollers 26 and 27 before it too passes between drive rollers 28 and 29.

In operation, rollers 28 and 29 frictionally engage the plastic laminating sheet materials 21 and 22 therebetween and are driven (by a mechanism not shown) so as to apply a driving force to the film in the direction of arrow 33. When this force is greater than the drag force imposed on rollers 12 and 13 plus any other frictional forces on the films opposing the drive means, the supply rollers 12 and 13 will rotate and pay out film which will then travel over the surfaces 25 and 30, enter between the laminating rollers 26 and 27 and be pulled through the drive rollers 28 and 29. A document 34 is fed between the films 21 and 22 after they have had their adhesive qualities activated (e.g., passed over the heat shoes 24 and 32) and as the film materials are brought together and pass between laminating rollers 26 and 27.

The heat supplied by heat shoes 24 and 32 elevates the temperature of the film sufficiently to activate the adhesive qualities of the film on the surface not in contact with the heat shoe surface so that when the document 34, for example, is placed between the heated plastic laminating material and exposed to the pressure applied by laminating rollers 26 and 27, the document will have a protective plastic coating, adhesively bonded to both of its surfaces and thereby be preserved and protected. The laminating rollers 26 and 27 are partially surrounded by the heat shoes 24 and 32, respectively, and thereby maintained at an elevated temperature. In this way, the rollers do not present a heat sink to the heated plastic film so as to reduce the temperature below that necessary to maintain the adhesive qualities of the film before pressure has been applied.

Everything described above with reference to FIGS. 1 and 2 is well known in the laminating art and accurately describes in general terms the methods and apparatus currently found in the overwhelming majority of laminating machines in operation and currently being manufactured.

There is a natural tendency for the film to develop wrinkles such as those shown at 37 on FIG. 1 as the film passes over the guide surfaces 25 and 30. It is essential that these wrinkles be eliminated before the film receives the document being laminated and before the two films are brought together and enter between the laminating rollers 26 and 27. The prior art method for eliminating these wrinkles is to increase the tension on the tension mechanisms 18 and 19 until the drag force on rollers 12 and 13 opposing the force drawing the film through the system is to cause the film to be pulled taut over the shoes 24 and 32, thus eliminating the wrinkles. This method has the several disadvantages revealed above.

In the present invention, the method of eliminating the wrinkles 37 is not to apply a drag force at the remote supply rollers, but rather to apply a vacuum to the film at or near the guide member (heat shoe) surface to create a light but uniform drag force across essentially the entire width of the film. When the vacuum means is located in the guide member itself, the vacuum also eliminates any air trapped between the guide surface and the film thereby creating a vacuum between all of surfaces 25 and the film 21 keeping the film in firm contact with the heat shoe over its entire area. In this way, the method of the present invention results in laminating rollers 26 and 27 receiving perfectly smooth, wrinkle-free, properly heated film as required for quality lamination. The amount of drag force imposed on the film by the vacuum need be slight as compared to the supply roller drag forces used in the prior art as discussed above. Thus, the slight drag force imposed by the vacuum means does not distort the film (which can cause curling of the laminated document after the film cools) and does not threaten film breakage even at start-up when the heat shoes are at their operating temperature.

With continuing reference to FIGS. 1 and 2, a vacuum means 41 is integrally associated with guide member (heat shoe) 24 while corresponding vacuum means 42 is integrally associated with guide member (heat shoe) 32. In the preferred embodiment of the present invention, vacuum means 41 (vacuum means 41 and 42 are identical and thus the description that follows of vacuum means 41 is accurate in all respects with regard to vacuum means 42) is in the form of a groove 43 formed in the surface 25 of guide member 24 and extending transverse to the direction of travel of film 21. The groove 43 extends over substantially the entire length of guide 24 or at least across the entire length of shoe 24 over which film passes. In this way, the entire surface of film 21 passes over groove 43 as it travels between idler 23 and laminating rollers 26 and 27. In the preferred embodiment of the invention, vacuum means 41 is located near where the film 21 first engages the surface 25 of guide member (heat shoe) 24. This assures that as the film travels beyond the vacuum means over the remaining surface 25 of heat shoe 24 all of the film will be in direct contact with the elevated temperature of surface 25 (the wrinkles having been eliminated) so that the entire surface of the laminating film will be properly temperature activated to its adhesive state. In order to eliminate or at least minimize the effects of any structural irregularities in the film itself, vacuum means 41 is located at or near surface 25 so that the forces in the film which eliminate the wrinkles do not have to travel far in the film. The application of an even distribution of force across the width of the film near where the wrinkles tend to form is so negligibly effected by structural film irregularities that film which must be rejected for use on prior art machines can be successfully used by machines and methods employing the present invention.

The short distance the film does travel over heat shoe surface 25 before it engages vacuum means 41 pre-heats the film further assuring a good interaction with the vacuum means.

Referring to FIGS. 4 and 5 vacuum means 41 includes a groove 43 formed in the surface 25 of guide (shoe) 24 and defined by a leading edge 44 and a trailing edge 46 and a generally flat recessed groove floor 47 therebetween. Both the leading edge 44 over which film 21 initially travels in being exposed to the vacuum means 41 and the trailing edge 46 over which the film travels as it exits the vacuum means are located within the plane of the guide member surface 25 while the intermediate groove floor is recessed therebelow. In order to apply a drag force across substantially the entire width of the film 21, groove 43 is operatively connected to a vacuum pump 45 by way of vacuum channels 48 and 49 (only 49 appears in FIG. 5) and associated vacuum ports 51 and 52(only 52 appears in FIG. 5). Vacuum channels 48 and 49 extend along the entire length of groove 43 and depend therefrom into the body of heat shoe 24 generally transverse to the flat groove floor 47. By way of example, the groove 43 can be approximately 0.020 of an inch deep and ⅜ of an inch between the leading edge and the trailing edge, with channels 48 and 49 ⅛ of an inch deep and 1/16 of an inch wide.

In operation, vacuum pump 45 draws air through ports 51 and 52 which communicate respectively with channels 48 and 49 which in turn open into groove 43. This reduces the pressure in groove 43 causing the pliable film 21 to be drawn into groove 43 along the entire width of the film. The action of the vacuum pump thus imposes an evenly distributed drag force along the entire width of the film which is overcome by the force applied to the film by the drive rollers 28 and 29. As the drive force carried through the film overcomes the opposing force applied by the vacuum means 41, the wrinkles in the film are eliminated and the film is in firm engagement with the surface 25. In addition, as the film 21 is pulled over the trailing edge 46 of groove 43, any air previously existing between the film and the surface 25 will be drawn away by the vacuum pump; the forces maintaining the film in contact with the surface 25 will prevent any air from being re-introduced therebetween.

The combination of the low drag force on the film and the application of the force at or very near to where the wrinkles exist permits very high speed operation. Whereas, prior art systems require greater forces with increased speed, no such requirement exists for the present invention and air disbursement from the wrinkles which is a limiting factor in prior art machines is not a problem for machines using the present invention due to the action of the vacuum means in drawing away any trapped air. Without the burden of high drag forces, machine parts last longer, film does not break and is not wasted in start-up and skilled operators are not required to monitor and adjust tension mechanisms. In addition, wide films can be as easily handled since they can be handled by the same low drag forces.

Whereas the preferred embodiment of the present invention locates the vacuum means within the guide member (heat shoe), the invention is not so necessarily restricted. The vacuum means can be separate from and located immediately ahead (up film) of the guide member and still provide the invention's important advantages. Referring to FIG. 3, a vacuum means 41 comprises vacuum body 24a having a groove 43a formed in the surface 25a thereof and defined by a leading edge 44a and a trailing edge 46a, both in the plane of surface 25a, and a recessed groove floor 47a therebetween. A bracket 50 attached to guide member 24 supports the vacuum body 24a immediately ahead (up film) of the guide 24 so that the force applied on the film 21 by vacuum means 41 is where the wrinkles occur. Channels 48a and 49a in block 24a extend the length of the groove 43a and connect to centrally located ports 51a and 52a for communication with a vacuum pump 45a. The operation of the vacuum means is as described above with reference to FIGS. 1 and 2.

With reference to FIG. 4A, an alternative embodiment of the vacuum means includes a single vacuum channel 53 leading to a single vacuum port 54 communicating groove 43 to a vacuum pump (not shown in this FIGURE). With the embodiment of FIG. 3 it is preferred to locate the vacuum channels 48 and 49 adjacent the trailing edge 46 and leading edge 44, respectively. With the single channel embodiment of FIG. 3A the desired results are achieved by locating the channel either adjacent leading edge 44 (as shown) or trailing edge 46. If located adjacent leading edge 44, trailing edge 46 is contoured to permit a smooth exit of the film.

Yet another embodiment of the vacuum means is shown in FIG. 4B and includes a groove 56 characterized by a concave groove floor 57 a single vacuum channel 58 depending from groove 56 approximately midway between the leading edge 59 and the trailing edge 61. The concave shape of groove floor 57 permits smooth entry and exit of the film.

In order for vacuum means 41 to establish a uniform drag force across the width of the film, it is necessary where the groove 43 extends beyond the edges of film 21 (FIG. 1) that some means be provided for creating a seal between the edge of the film and the groove. In the case where a laminating machine operates with film only of a fixed width, the groove 43 formed in the guide member (heat shoe) can have a fixed length slightly less than the width of the film and edge sealing will be automatic where the film edges extend slightly beyond the vacuum groove. Where, however, as is most customary a machine operates with films of various widths, it is necessary to provide means to create a seal at the edge of the film where the film is not as wide as the vacuum groove 43.

Referring to FIG. 6, edge seals are provided by a pair of guide blocks 61 each having a pair of depending sealing legs 62 and 63 dimensioned and spaced to slide within channels 49 and 48, respectively, and support therebetween a film edge guide including a surface 64 which is flush with the surface 25 when legs 62 and 63 are disposed in the channels 49 and 48 and a raised section 66 forming a step with the surface 64 creating the vertical edge 67 against which the edge of film 21 is guided (see FIG. 1). When legs 62 and 63 rest on the bottom of channels 49 and 48, the under surface 68 of block 61 rides on groove surface 47 thereby creating an air seal.

With additional reference to FIG. 5, the vacuum ports 51 and 52 (FIG. 4) and 54 (FIG. 4A) are most advantageously located near the midpoint along the length of groove 43 so as to be between guide blocks 61 for any width film. The sealing legs 62 and 63 and under surface 68 operate to seal from the pump 45 the portion of groove 43 including channels 48 and 49, that are not between blocks 61. In this way, blocks 61 provide an easy means for adjusting the effective length of groove 44 to accommodate films of varying widths. A single sealing leg would replace legs 62 and 63 for the embodiments of FIGS. 4A and 4B.

With reference to FIG. 7, an alternative sealing arrangement is to form a plurality of sub-channels 71 in a groove 43 wherein each sub-channel is connected to vacuum pump 45 through its own vacuum port 72 and between each vacuum port 72 and the vacuum pump 45 is a control valve 73. In the example shown in FIG. 5, the effective length of the vacuum groove 43 can be reduced by adjusting the outer two valves to prevent communication with their associated sub-channels 71. In this way, only the central three sub-channels will be in communication with the vacuum pump and will properly accommodate a film having a width slightly greater than the length of the groove occupied by the three inner sub-channels 71. Once again, if the edges of the film extend slightly beyond the edges of the operating sub-channels, edge sealing will be accomplished.

Referring to FIGS. 8 and 9, an alternative embodiment of the invention forms the vacuum means 41 in guide member 24 by a groove 76 which is generally rectangular in cross-section (with the long dimension measuring the groove depth into the guide member) and operates as a combined groove and channel. By way of example, if the groove is formed at the curved portion of guide 24 it can be ⅛ of an inch between leading wall 77 and trailing wall 78, 3/16 on an inch deep (in the guide member) and as much as 5/16 of an inch between leading edge 81 and trailing edge 82 (the difference is accounted for by the curve of surface 25). The The trailing edge 82 is rounded to reduce the stress on the film as it passes out of the groove. Although this embodiment does not provide a groove floor to support the film, the rounded trailing edge 82 provides the same function. It has been found that this embodiment of the invention has the advantage of requiring less vacuum pressure to produce the drag force necessary to eliminate wrinkles than that for the other described embodiments.

A sealing block 83 for groove 76 is formed to fill groove 76 and provide an outer surface 84 that is contiguous with guide surface 25. An integral handle portion 87 of sealing block 83 permits the block to be easily positioned along groove 76. A pair of blocks 83 thus perform the same function as described with reference to blocks 61 but being of a much simpler geometric shape can be more easily and inexpensively made.

What is claimed is:

1. In a laminating machine of the type using heat activated laminating plastic film material in roll form for bonding to a substrate, and having a supply roller on which a roll of such film is mounted, a heat shoe having a heated guide surface including an initial edge over which laminating plastic material passes in contact therewith in order to raise the temperature of the film to the degree necessary to activate the films adhesive qualities, laminating rollers between which the heated laminating plastic material and substrate pass after the laminating plastic material passes over the guide surface, and drive means applying a force on the laminating plastic material after it passes through the laminating rollers to be continuously fed off of the supply roller, over the guide surface and through the laminating rollers, the improvement comprising:

vacuum means disposed in the path of the laminating material adjacent to the initial edge of the guide surface engaging the laminating material before it contacts any substrate, before it passes between the laminating rollers, and before it passes entirely over the guide surface, said vacuum means applying a drag force on the laminating material in opposition to the force applied by the drive means wherein the drag force so applied is great enough to smooth out any wrinkles in the film and cause the film to fully engage the guide surface over the entire surface of the film whereby the film adhesive is activated over the entire film surface, all without stretching the film to the extent that curl of the finished product results.

2. The invention of claim 1 wherein said vacuum means extends across the entire width of the laminating material and applies a generally uniform drag force across the entire width of the material.

3. The invention of claim 2 wherein said vacuum means is integrally formed in the heat shoe.

4. The invention of claim 1 wherein said vacuum means comprises a groove generally transverse to the direction of travel of the laminating plastic material thereover, and vacuum pump means operatively connected to said groove for drawing air from said groove.

5. The invention of claim 4 wherein said groove is formed in the heat shoe.

6. The invention of claim 4 wherein said groove is defined by a leading edge over which laminating plastic material first passes, a trailing edge over which laminating plastic material passes in exiting said vacuum means and a groove floor therebetween and further comprises at least one vacuum channel in said groove between said leading edge and said trailing edge through which air in said groove is carried to said pump means.

7. The invention of claim 6 wherein there are two vacuum channels, one adjacent said leading edge and one adjacent said trailing edge.

8. The invention of claim 6 wherein there is one vacuum channel and it is located adjacent either said leading edge or said trailing edge.

9. The invention of claim 6 wherein there is one vacuum channel and it is located approximately midway between said leading edge and said trailing edge.

10. The invention of claim 9 wherein said groove floor is generally concave.

11. The invention of any of claims 6–9 wherein said leading edge and said trailing edge are within the plane of the guide surface and the groove floor therebetween is recessed below the guide surface.

12. The invention of any of claims 6–9 wherein each channel extends substantially the entire length of said groove.

13. The invention of any of claims 6–9 further comprising a pair of guide blocks movably disposed in said groove, said blocks including guide members that extend above the plane of the guide surface and operate to guide the edge of laminating plastic material passing thereover, and seal members that fill said channels and prevent the flow of air to the pump means from those portions of said groove not between said blocks.

14. The invention of claim 5 wherein the guide surface is arcuate and said groove is rectangular in cross-section where the long dimension of the rectangle measures the depth of the groove into the guide member.

15. The invention of claim 14 further comprising a pair of guide blocks slidably disposed in said groove including a generally rectangular seal portion dimensioned to fill said groove and an attached handle portion which extends out of the groove.

16. The invention of claim 4 wherein said channel comprises a plurality of separate sub-channels in said floor of said groove, extending along the length of said groove wherein each sub-channel is independently connected to said pump means by a separate independently operated valve means.

* * * * *